Dec. 6, 1955  A. R. SANTOS  2,725,649

DISK GANG TYPE DITCHING IMPLEMENT

Filed Sept. 12, 1950

ANTHONY R. SANTOS
INVENTOR

HUEBNER, BEEHLER,
WORREL & HERZIG
ATTORNEYS

BY Richard M. Worrel

2,725,649

DISK GANG TYPE DITCHING IMPLEMENT

Anthony R. Santos, Waukena, Calif.

Application September 12, 1950, Serial No. 184,408

5 Claims. (Cl. 37—98)

The present invention relates to ditching implements and more particularly to an apparatus for forming and for cleaning irrigation ditches and the like of weeds, leaves, and other debris.

In irrigable lands, it is a well known practice to convey irrigation water from a source thereof, such as a pump, spring, river, or the like, to irrigation furrows for absorption by the soil by means of what is generally referred to as a head ditch. Not only is the formation of head ditches a laborious task but such ditches rapidly become infested with weeds which in turn not infrequently harbor insects and other pests. The weeds impede the flow of water through such ditches so that the speed of irrigation is substantially restricted if not actually made impossible. Further, the weeds growing in such head ditches drop their seeds in the water and are efficiently sewn throughout the irrigated land. Because of these and other difficulties, the head ditches are either periodically destroyed and reformed as needed, in order to destroy the weeds and to reduce the insects and other pests harbored therein, or the head ditches are periodically cleaned. Periodic destruction and reformation of head ditches is not only a laborious and time consuming task but is of such expense as frequently to be impractical.

The cleaning of head ditches has been accomplished generally in either of two conventional ways; removal of the weeds and debris manually and removal by a tractor pushed implement. The hand digging of weeds and debris from the ditches is an exceedingly costly and time consuming procedure. As a result V plows have been developed which are borne directly on track laying tractors. The initial cost of such devices is high because of their complexity and production by custom built methods necessitated by restricted demand. Further, they require a great deal of power for motivation through the ditches. These devices have not succeeded in accommodating ditches having banks of varied sizes and shapes and have been controlled for even rough operation only with considerable difficulty.

An object of the present invention is to provide an improved apparatus for forming and cleaning irrigation ditches and the like.

Another object is to provide a ditch forming and cleaning apparatus characterized by improved control and regulation as compared to conventional implements employed for ditch forming and cleaning operations.

Another object is to provide a ditch forming and cleaning apparatus adapted to achieve its intended purposes with substantially less power than required by conventional ditching implements.

Another object is to provide a ditch cleaning device adapted automatically to accommodate ditches defined by banks of varied size, shape, and relationship.

A further object is to provide improved elements and arrangements thereof in a device of the character and for the purposes set forth that is economical to construct, dependable in operation, and fully effective in performing its intended functions.

Referring to the drawing.

Figure 1:
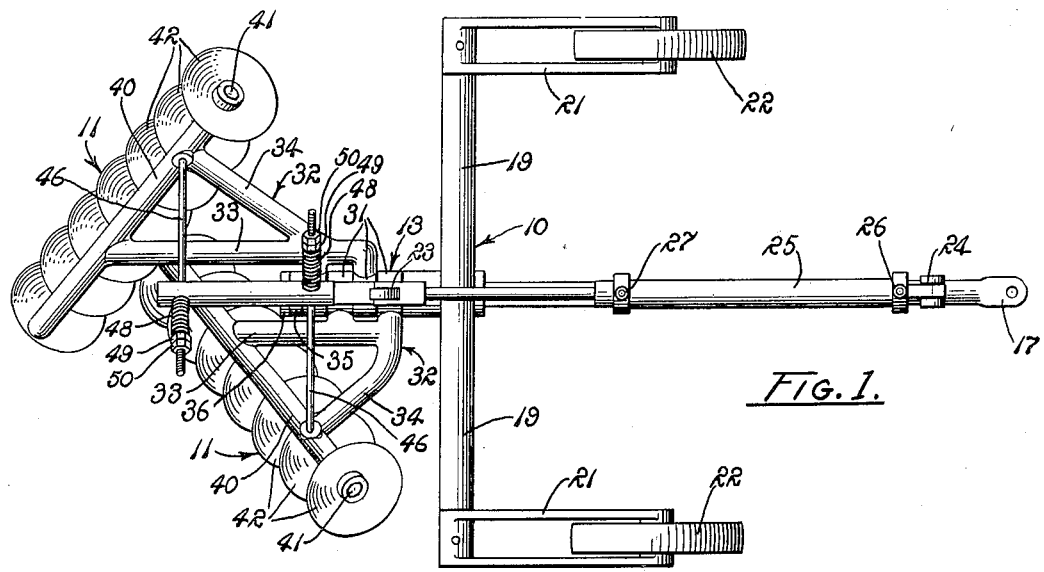
Fig. 1 is a plan view of a ditching apparatus embodying the principles of the present invention.

Referring in greater detail to the drawing, the ditching apparatus is shown to employ a forwardly movable draft frame 10 mounting a pair of gangs 11 of disc harrow blades transversely disposed to the frame having overlapped inner end portions and forwardly and upwardly extended opposite outer end portions by hinge means 13 for individual pivotal movement about an axis substantially aligned with the normal direction of movement of the frame.

The draft frame 10 conveniently consists of a tongue 16 having a forward end portion 17 adapted for connection to a draft appliance and a rearward end portion 18 mounting a horizontal tubular member 19 in substantially right angular relation thereto. An axle 20 is journaled in the tubular member and at opposite ends thereof mounts bifurcated wheel yokes 21 correspondingly radially extended from the axle. A ground support wheel 22 is rotatably mounted in each of the yokes.

In order accurately to control the elevation of the frame relative to earth traversed, the tubular member 19 is transversely slotted in alignment with the tongue 16 and an elevational control arm 23 radially extended from the axle 20 through the slot. A bracket 24 is upwardly extended from the tongue 16 in forward spaced relation to the control arm 23 and a two way hydraulic ram 25, or other suitable control means, is pivotally connected between the control arm and the bracket. Fragmentarily illustrated in connection with the ram, is a ram expansion conduit 26 and contraction conduit 27. Controlled expansion and contraction of the ram by the well known method of imparting fluid pressure to the ram through the expansion conduit or the contraction conduit while the opposite end of the ram is bled, rotates the axle, pivotally positions the yokes, and controls the elevation of the frame above the earth traversed.

A pintle shaft 30 is rearwardly extended from the draft frame 10 and may, if desired, take the form of a cylindrical rearward extension of the tongue 16, as shown. A plurality of bearings 31 are journaled concentrically on the pintle shaft 30 in adjacent relation. A pair of brackets 32 are rearwardly and oppositely laterally extended from the bearings, the brackets being individually mounted on alternate bearings for individual pivotal movement. Each of the brackets conveniently employs a substantially rearwardly directed leg 33 and a rearwardly and outwardly directed leg 34 angularly related thereto. The bearings 31 are constrained to predetermined axial position on the pintle shaft 30 by a collar 35 secured to the pintle shaft in circumscribing relation thereto in spaced relation to the rearward end of the shaft and by a nut 36 screw-threadably mounted on the rearward end of the pintle shaft and locked thereon, as by a pin 37.

Although the frame 10 is referred to as a "draft" frame, it is to be understood that the frame shown is intended simply to illustrate carriages generally for the pintle shaft which may take innumerable forms and accomplish the desired earth traversing motivation.

The gangs of disk harrows are individually mounted on the rearwardly extended legs 33 and 34 of the brackets 32 for individual elevational movement. For this purpose, each of the brackets 32 is provided with a generally U-shaped inverted arch bar 40 integral therewith. Each arch bar provides a pair of depending extensions rotatably mounting an axle 41 therein in oblique angular relation to the tongue 16. The axles have overlapped inner end portions and upwardly and forwardly extended outer end portions. A plurality of concave disk harrow blades 42 are mounted concentrically on the axles and faced axially upwardly of their respective axles.

A boom 45 is rigidly mounted on the draft frame 10 and is rearwardly and upwardly extended therefrom in substantial vertical alignment with the pintle shaft 30. An arm 46 is swivelly connected to each of the outwardly extended end portions of the arch bars 40 and slidably extended upwardly through openings 47 provided in the rearwardly extended end portion of the boom. The arms are preferably only loosely fitted to the openings 47 so that relative universal and sliding movement of the arms relative to the boom can be accommodated. Helical compression springs 48 are positioned about the arms 46 above the boom and placed under initial compression by nuts 49 screw-threadably mounted on the upwardly extended end portions of the arms. The nuts 49 preferably have jam nuts 50 associated therewith to resist unintentional displacement from predetermined position achieving the desired compression of the springs 48 and their resilient support of the gangs of disk harrows 11.

Operation

Figure 2:
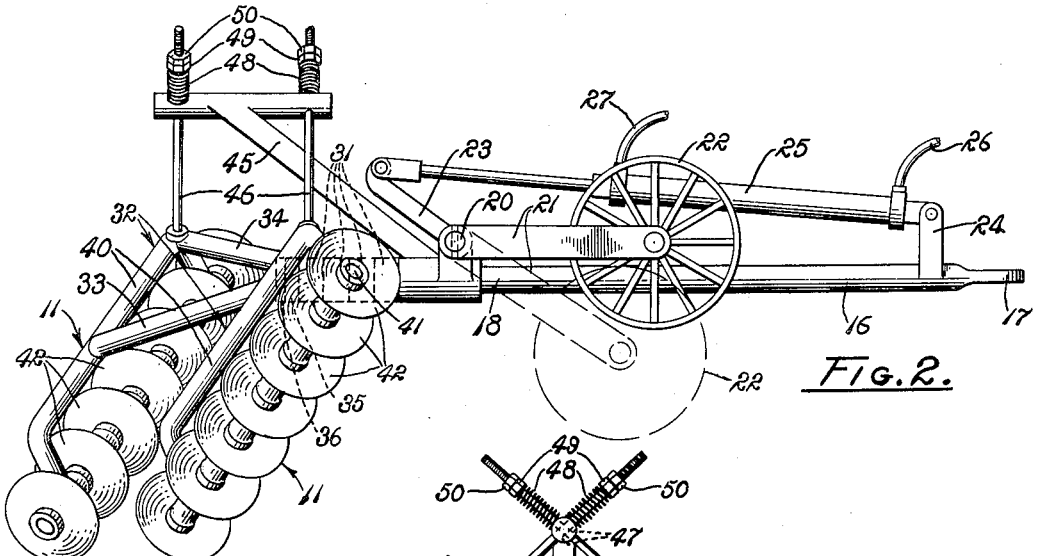
Fig. 2 is a side elevation of the ditching apparatus shown in Fig. 1.

The mode of operation of the subject ditch forming and cleaning apparatus is believed to be clearly apparent and is briefly summarized at this point. The draft frame 10 is connected in following relation to a draft appliance, not shown, by means of the forward end portion 17 of the tongue 16. To transport the apparatus, the ram 25 is contracted, moving the yokes 21 into their downwardly extended positions, as shown fragmentarily in dashed lines in Fig. 2. So positioned, the wheels 22 support the frame and the gangs of disk harrows 11 above the earth traversed.

Figure 3:
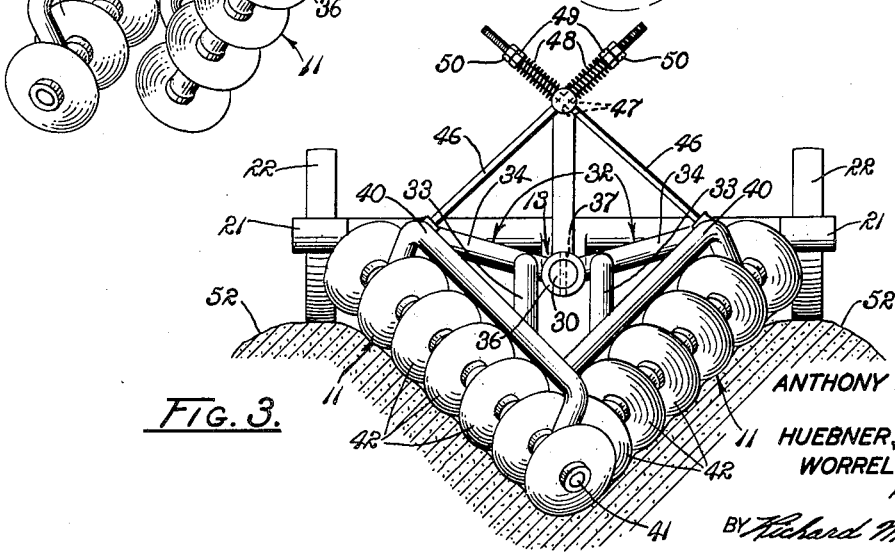
Fig. 3 is a rear elevation of the ditching apparatus of the present invention shown in operable position in a ditch being cleaned.

The apparatus is drawn to an area in which it is desired to form a ditch or to a position with the wheels 22 straddling a ditch to be cleaned. The ram 25 is expanded by proper manipulation of the supply of fluid under pressure thereto, and the yokes 21 pivoted into the position shown in full line in Fig. 2 as well as Figs. 1 and 3, or less extreme position as desired, lowering the inner overlapped portions of the gangs of disk harrows 11 into the bottom of the ditch. With the gangs so positioned, the apparatus is drawn along the ditch to be cleaned, or path along which a ditch is to be formed, with the wheels in straddling relation thereto.

The resilient support of the outer end portions of the gangs 11 by the spring 48 and the pivotal mounting of the gangs previously described, permit the outer end portions of the gangs to rise and fall in accommodation with varied bank size, shape and spacing of the ditch. It is to be observed that the rising and falling of the outer ends of the gangs does not appreciably modify the relative positions of the overlapped inner end portions of the gangs. By adjustment of the nuts 49 and jam nuts 50 and resultant regulation of the compression of the springs 48, the gangs 11 can be predeterminately adjusted for relatively sharp or vertically sided ditches or relatively flat ditches.

The device of the present invention while drawn along a ditch engages earth, weeds, and debris with the disk harrow blades 42 which, being rotated by earth engagement in the usual way, slice the engaged material and turn the same over and move strips thereof upwardly of the ditch banks. The device is simple in operation, economical to construct, durable to employ, and conveniently and easily accomplishes the destruction of weeds in preexisting ditches, and/or the formation of new ditches as desired.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a ditch forming and cleaning machine, the combination of a draft frame having a forward end portion adapted for connection to a draft appliance and a rearward end portion, ground engaging support wheels, means mounting the frame on the support wheels adjustable to raise and to lower the frame on the wheels, a pintle shaft rearwardly extended substantially horizontally from the draft frame, a pair of brackets pivotally mounted concentrically on the pintle shaft and rearwardly and oppositely laterally extended therefrom, a pair of gangs of disk harrow blades individually mounted on the brackets in opposite oblique angular relation to the direction of movement of the frame having overlapping inner end portions and upwardly and forwardly extended outer end portions, and adjustable means borne by the frame resiliently supporting the outer end portions of the gangs at predetermined elevations.

2. A ditching machine comprising a pintle shaft, a draft frame mounting the pintle shaft for endward movement in a substantially horizontal attitude and at adjustably regulated heights, a plurality of axially adjacent bearings mounted concentrically on the pintle shaft, a pair of brackets mounted on the bearings in endward and oppositely laterally extending relation thereto, the brackets being individually mounted on the bearings for individual pivotal movement, a pair of axles rotatably mounted individually by the extended ends of the brackets in oblique angular relation to the direction of movement of the pintle shaft, said axles having overlapped inner end portions and upwardly and forwardly extended outer end portions, a plurality of concave disk harrow blades mounted concentrically on each axle with the concavities thereof faced axially upwardly of their respective axles, and means mounted on the frame in resilient supporting relation to the outwardly extended end portions of the axles.

3. In a ditch forming and cleaning machine, the combination of a draft frame having a forward end portion adapted for connection to a draft appliance and a rearward end portion, ground engaging support wheels, means mounting the frame on the wheels, a pintle shaft rearwardly extended substantially horizontally from the draft frame, a pair of brackets pivotally mounted concentrically on the pintle shaft and rearwardly and oppositely laterally extended therefrom, a pair of gangs of disk harrow blades individually mounted on the brackets in opposite oblique angular relation to the direction of movement of the frame having overlapping inner end portions and upwardly and forwardly extended outer end portions, a boom rearwardly extended from the frame in substantially vertical alignment with the pintle shaft, an arm connected to the outer end portion of each gang and slidably extended upwardly through the rearward end portion of the boom, and springs mounted under adjustable compression between the extended upper ends of the arms and the boom in resilient supporting relation to the outer ends of the brackets.

4. A ditch forming and cleaning apparatus comprising a frame adapted for connection to a draft appliance for earth traversing movement of the frame along a line of travel in predetermined relation to the frame, a pintle shaft extended from the frame rearwardly of said predetermined line of travel, a plurality of bearings rotatably mounted concentrically on the rearward end portion of the pintle shaft, a pair of brackets rearwardly and oppositely laterally extended from the bearings, the brackets being individually mounted on alternate bearings for individual pivotal movement, a pair of axles rotatably mounted individually by the rearwardly extended ends of the brackets in oblique angular relation to the predetermined line of travel, said axles having overlapped inner end portions and upwardly and forwardly extended outer end portions, a plurality of concave disk harrow blades mounted concentrically on each axle with the concavities thereof faced axially upwardly of their respective axles, a boom extended from the frame rearwardly of said line of travel in substantially vertical alignment with the pintle shaft, an arm swively connected to the extended end portion of each bracket and slidably extended upwardly through the rearward end portion of the boom for universal movement relative thereto, a nut screw-threadably mounted above the boom on the upwardly extended end portion of each arm, and a spring mounted on each arm between each nut and the boom in supporting relation to its respective arm and the extended end portion of the bracket to which its arm is connected.

5. In an irrigation ditch forming apparatus comprising a frame mounted for earth traversing movement in predetermined direction relative to the frame and for adjustable elevational movement, an elongated pintle shaft substantially horizontally extended from the frame in longitudinal alignment with the predetermined direction of movement thereof for adjustable elevational movement therewith, a pair of brackets pivotally mounted concentrically on the pintle shaft and rearwardly and oppositely laterally extended therefrom, a pair of gangs of disc harrow blades individually supported on the brackets in opposite oblique angular relation to the direction of movement of the frame having overlapping inner end portions and upwardly and forwardly extended outer end portions, and means mounted on the frame resiliently supporting the outwardly extended end portions of the axles at predetermined elevations above the inner end portions thereof.

References Cited in the file of this patent

UNITED STATES PATENTS

| Number | Name | Date |
|---|---|---|
| Re. 22,333 | White | June 8, 1943 |
| 540,550 | Hisle | June 4, 1895 |
| 638,514 | Hunt et al. | Dec. 5, 1899 |
| 1,449,584 | Butler | Mar. 27, 1923 |
| 1,631,639 | McDonald | June 7, 1927 |
| 1,846,489 | Johnson | Feb. 23, 1932 |
| 2,018,138 | Le Tourneau | Oct. 22, 1935 |
| 2,191,537 | Miller | Feb. 27, 1940 |
| 2,335,156 | McMahon | Nov. 23, 1943 |
| 2,347,335 | Sousa | Apr. 25, 1944 |
| 2,420,437 | McMahon | May 13, 1947 |
| 2,430,732 | Orelind et al. | Nov. 11, 1947 |
| 2,455,566 | Deakins | Dec. 7, 1948 |
| 2,518,646 | Strauss | Aug. 15, 1950 |